United States Patent
Goldsmith

(10) Patent No.: US 10,419,636 B2
(45) Date of Patent: Sep. 17, 2019

(54) METHODS AND SYSTEMS FOR EMBEDDING INFORMATION INTO TEXT OF PRINTABLE DOCUMENTS BY ALTERING ONE OR MORE OF THE GLYPHS TO CHANGE A SHAPE OF THE GLYPHS

(71) Applicant: Global Graphics Software Limited, Cambridge (GB)

(72) Inventor: Roger Goldsmith, Cambridge, MA (US)

(73) Assignee: GLOBAL GRAPHICS SOFTWARE LIMITED, Cambridge (GB)

(*) Notice: Subject to any disclaimer, the term of this patent is extended or adjusted under 35 U.S.C. 154(b) by 0 days.

(21) Appl. No.: 15/453,811

(22) Filed: Mar. 8, 2017

(65) Prior Publication Data
US 2018/0262641 A1 Sep. 13, 2018

(51) Int. Cl.
*H04N 1/32* (2006.01)
*G06F 3/12* (2006.01)

(52) U.S. Cl.
CPC ......... *H04N 1/3232* (2013.01); *G06F 3/1208* (2013.01); *G06F 3/1243* (2013.01); *G06F 3/1244* (2013.01); *H04N 1/32149* (2013.01); *H04N 2201/3233* (2013.01); *H04N 2201/3283* (2013.01)

(58) Field of Classification Search
CPC ............ H04N 1/3232; H04N 1/32149; H04N 2201/3233; H04N 2201/3283; G06F 3/1243
See application file for complete search history.

(56) References Cited

U.S. PATENT DOCUMENTS

| | | | | |
|---|---|---|---|---|
| 2008/0093468 A1* | 4/2008 | Fan | ............... | B42D 15/0073 235/494 |
| 2008/0296885 A1* | 12/2008 | Fan | ............... | B41M 3/14 283/67 |
| 2010/0164984 A1* | 7/2010 | Rane | ............... | H04N 1/32203 345/611 |

* cited by examiner

*Primary Examiner* — Christopher Wait
(74) *Attorney, Agent, or Firm* — Lowe Graham Jones PLLC; Bruce E. Black

(57) ABSTRACT

Information can be encoded into text of a printable document or other printed material. The text includes glyphs, where each glyph corresponds to a text character. Additional information can be encoded into the text by altering one or more of the glyphs to change a shape of the one or more of the glyphs, so that each of the altered glyphs still corresponds to the text character to which the glyph corresponded prior to alteration and the altered glyph further contains a portion of the additional information encoded by the changed shape.

20 Claims, 3 Drawing Sheets

METHODS AND SYSTEMS FOR EMBEDDING INFORMATION INTO TEXT OF PRINTABLE DOCUMENTS BY ALTERING ONE OR MORE OF THE GLYPHS TO CHANGE A SHAPE OF THE GLYPHS

FIELD

The present invention is directed to the area of document processing and printing. The present invention is also directed to methods and systems for embedding hidden information into printable documents.

BACKGROUND

People have hidden information within documents and images for hundreds of years using a variety of methods. In recent years, the ability to copy documents and other printed matter has become much more accurate and widespread, increasing the value, within production print such as in the packaging and label space, of using hidden information for purposes such as anti-counterfeiting and track/trace of documents.

Examples of current methods include overt methods that are immediately visible, such as regular text, barcodes, holograms and sealing tapes, and covert methods are detectable, but do not immediately catch the eye, such as RFID tags, watermarks, color flecks or the like in the media, inks visible only under a UV lamp (black light) and steganography within images, and so forth. Some methods are arguably mid-way between overt and covert, such as complex guilloches or microtext. There is a need for providing information that is hidden, covert, or difficult to ascertain on printed products in an efficient manner and, preferably, with lower manpower, capital, or manufacturing costs than are found in current methods.

Another trend in the printing industry is the increasing use of variable data, for personalization or for other use cases where producing multiple unique prints that vary in some way provides a value. Variability can be applied both to the regular text and graphics on a printed piece, but also to the information hidden in overt or covert ways.

BRIEF SUMMARY

One embodiment is a method of encoding information into text of a printable document. The method includes receiving a document including text, wherein the text includes a plurality of glyphs, wherein each glyph corresponds to a text character; receiving additional information to be encoded in the document; and encoding the additional information into the document by altering one or more of the glyphs to change a shape of the one or more of the glyphs, wherein each of the altered glyphs still corresponds to the text character to which the glyph corresponded prior to alteration and the altered glyph further contains a portion of the additional information encoded by the changed shape.

In at least some embodiments, encoding the additional information includes altering the one or more of the glyphs by removing at least one serif from each of the one or more glyphs. In at least some embodiments, encoding the additional information includes altering the one or more of the glyphs by altering a width or length of at least one stroke of each of the one or more glyphs. In at least some embodiments, encoding the additional information includes altering the one or more of the glyphs by altering a position of a joint between strokes or adjusting a size of a feature of each of the one or more glyphs. In at least some embodiments, the additional information includes altering the one or more of the glyphs by placing a gap in a stroke or in a joint between strokes of each of the one or more glyphs.

Another embodiment is a method of encoding information into text of a printable document. The method includes receiving information to be encoded in a document; and generating the document, wherein the document includes a plurality of glyphs, wherein each glyph represents a text character, wherein one or more of the glyphs have a shape that encodes a portion of the information in the shape of the glyph while still representing the text character.

In at least some embodiments, the shape of the one or more of the glyphs has at least one serif removed as compared to a glyph that represents the text character but does not encode a portion of the information. In at least some embodiments, the shape of the one or more of the glyphs has at least one stroke with a different wide or length as compared to a glyph that represents the text character but does not encode a portion of the information. In at least some embodiments, the shape of the one or more of the glyphs has a position of a joint between strokes or a feature that is different than a glyph that represents the text character but does not encode a portion of the information. In at least some embodiments, the shape of the one or more of the glyphs has a gap in a stroke or in a joint between strokes that is different from a glyph that represents the text character but does not encode a portion of the information.

A further embodiment is a method of extracting encoded information from text of a printable document. The method includes receiving a document, wherein the document includes a plurality of glyphs, wherein each glyph represents a text character, wherein one or more of the glyphs have a shape that encodes a portion of the encoded information in the shape of the glyph while still representing the text character; and extracting the encoded information from the document by investigating each of the glyphs and retrieving the encoded information by observation of the shapes of the glyphs.

In at least some embodiments, the shape of the one or more of the glyphs has at least one serif removed as compared to a glyph that represents the text character but does not encode a portion of the information. In at least some embodiments, the shape of the one or more of the glyphs has at least one stroke with a different wide or length as compared to a glyph that represents the text character but does not encode a portion of the information. In at least some embodiments, the shape of the one or more of the glyphs has a position of a joint between strokes or a feature or a gap in a stroke or a joint between strokes that is different than a glyph that represents the text character but does not encode a portion of the information.

A further embodiment is a system for processing a document for printing. The system includes at least one processor configured and arranged to perform any of the methods described above.

Yet another embodiment is a non-transitory computer-readable medium having processor-executable instructions for processing documents, the processor-executable instructions when installed onto a device enable the device to perform any of the methods described above.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to the area of document processing and printing. The present invention is also directed to methods and systems for embedding hidden information into printable documents.

As disclosed below, the methods and systems described herein can be used to embed information within printed material, such as packaging, labels, or any other printed work. Such embedded information can be used to provide additional information, to authenticate the printed matter as genuine, or to assist in tracking and identifying the source of documents. Examples of documents can include tickets, financial documents, folding cartons for pharmaceuticals or other goods, labels for high-value goods such as spirits, and the like. In at least some embodiments, the methods and systems can embed information in a way that is amenable to rapid variation. In at least some embodiments, the embedded information can be different for every instance of a printed piece, if desired.

The methods, systems, and devices described herein may be embodied in many different forms and should not be construed as limited to the embodiments set forth herein. Accordingly, the methods, systems, and devices described herein may take the form of an entirely hardware embodiment, an entirely software embodiment or an embodiment combining software and hardware aspects. The following detailed description is, therefore, not to be taken in a limiting sense. The methods described herein can be performed using any type of processor and any suitable type of device that includes a processor.

Figure 1:
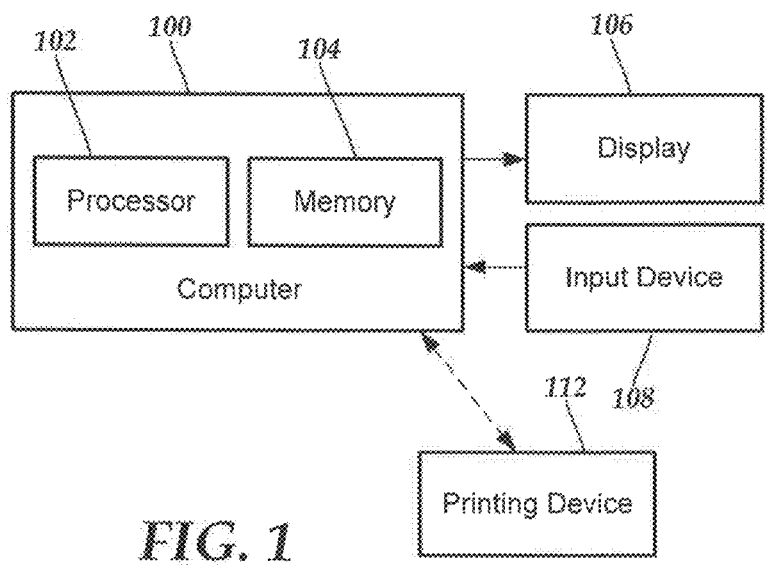
FIG. 1 is a schematic block diagram of one embodiment of a system for encoding information into text of a printable document, according to the invention.

FIG. 1 illustrates one embodiment of a system for practicing the invention. The system can include a computer 100 or any other device that includes a processor 102 and a memory 104, an optional display 106, an optional input device 108, and, optionally, a printing device 112, such as a printer or press. The printing device 112 can be an inkjet device, an electrophotographic (e.g., toner) device, engraver (e.g., a laser engraver), or any other suitable device. In some embodiments, one or more of the computer 100, display 106, or input device 108 can be part of the printing device 112.

The computer 100 can be a laptop computer, desktop computer, server computer, tablet, mobile device, smartphone or other devices that can run applications or programs, or any other suitable device for processing information and for presenting a user interface. Alternatively or additionally, the computer 100 can be part of the printing device 112 or coupled (by wired or wireless coupling) to the printing device. The computer 100 can be local to the user or can include components that are non-local to the user including one or both of the processor 102 or memory 104 (or portions thereof). For example, in some embodiments, the user may operate a terminal that is connected to a non-local computer. In other embodiments, the memory can be non-local to the user.

The computer 100 can utilize any suitable processor 102 including one or more hardware processors that may be local to the user or non-local to the user or other components of the computer. The processor 102 is configured to execute instructions provided to the processor, as described below.

Any suitable memory 104 can be used for the computer 102. The memory 104 illustrates a type of computer-readable media, namely computer-readable storage media. Computer-readable storage media may include, but is not limited to, nonvolatile, non-transitory, removable, and non-removable media implemented in any method or technology for storage of information, such as computer readable instructions, data structures, program modules, or other data. Examples of computer-readable storage media include RAM, ROM, EEPROM, flash memory, or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computer.

Communication methods provide another type of computer readable media; namely communication media. Communication media typically embodies computer-readable instructions, data structures, program modules, or other data in a modulated data signal such as a carrier wave, data signal, or other transport mechanism and include any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

The optional display 106 can be any suitable display device, such as a monitor, screen, display, or the like. The optional input device 108 can be, for example, a keyboard, mouse, touch screen, track ball, joystick, voice recognition system, or any combination thereof, or the like and can be used by the user to interact with a user interface.

Figure 2:
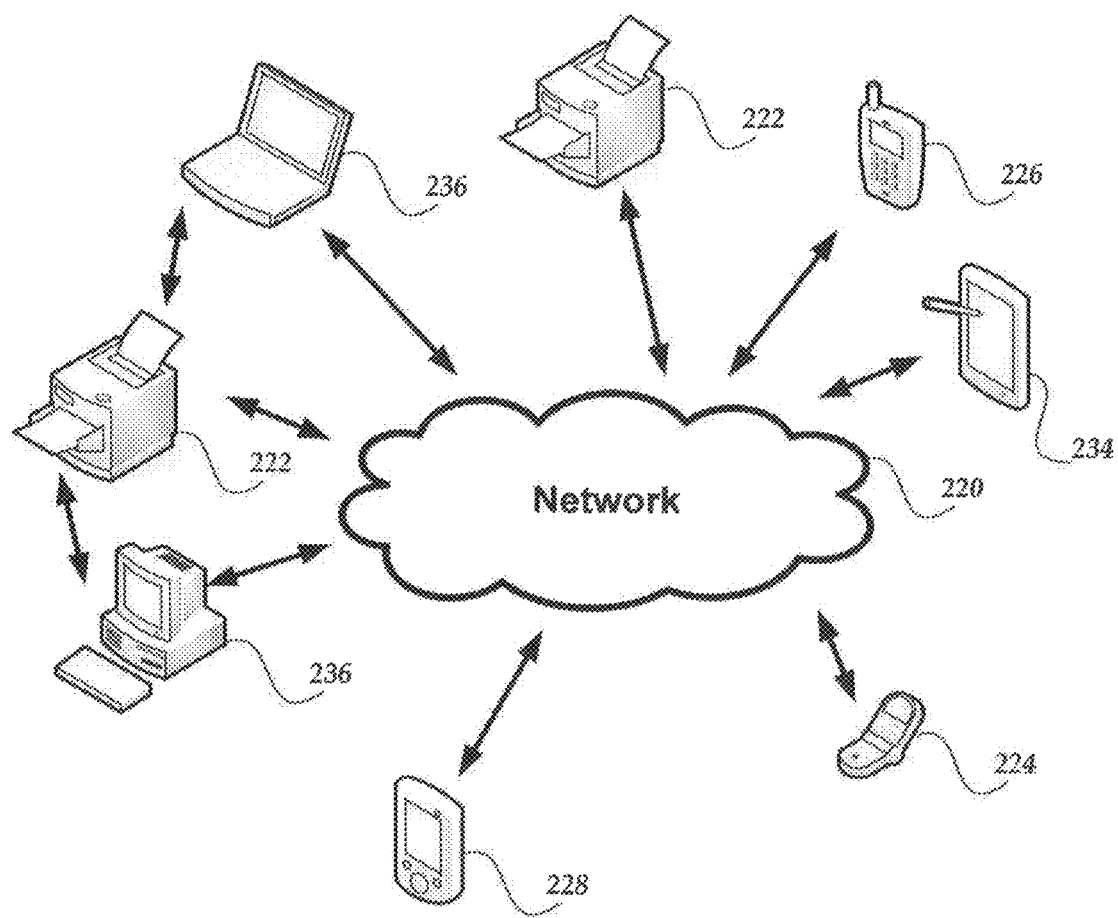
FIG. 2 is a schematic diagram of a network for use in a system for encoding information into text of a printable document, according to the invention.

FIG. 2 illustrates one embodiment of an environment for the invention. In FIG. 2, a network environment is illustrated, but it will be understood that the invention is also applicable to unnetworked devices (e.g., printers and computers) as well. It will be understood that the network environment can be a local area network, a wide area network, or any combination thereof. It will also be understood that the network can include devices, other than those illustrated, coupled to the network and that there may be multiple devices of each type illustrated connected to the network.

The illustrated environment of FIG. 2 includes a network 220 to which is attached, either directly or through other devices, and one or more printers or presses 222. Unless otherwise indicated, the terms "printer" and "press" are used interchangeably herein. Other devices that can be attached to the network or to a printer/press include cell phones 224, smart phones 226, personal data assistants (PDA's) 228, tablet or slate computers 234, and computers/servers 236 (e.g., desktop or laptop computers or servers). Any of these devices, as well as the printer or press 222, can correspond to the computer 100 of FIG. 1. Other devices can optionally be attached to the network such as portable storage devices (e.g., compact discs, DVDs, memory sticks, flash drives, or other optical or magnetic storage media) and the like. Any of these devices can be connected directly to the network or via another device. A device can optionally be connected directly to a printer 222 through a wired or wireless connection or can be connected to the printer through the network. Attachment to the network or to devices in the network can be wired or wireless connection or any combination thereof.

Industry is moving towards the use of shorter and shorter run lengths, more product versioning and more information that can be recorded and associated with each product. The adoption of digital printing technology for labels and packaging makes it possible to print different information on every label or every package if desired.

The methods and systems described herein can be used to also provide embedded information (for example, encoded or variable information) into printed matter or into computer files that can be subsequently printed. Examples of the variable embedded information that might be used in this way include simple batch numbers, time and date of manufacture, an identifier for the printing machine used or the site of manufacture, the channel through which the product is being distributed, the intended recipient of the package or product, or the like. Some of that variable information may be most valuable in an overt form, e.g. an address to guide delivery. Some may be most valuable if it is not immediately obvious or not amenable to copying. In addition, some more static information designed to describe and authenticate the package contents may be combined with the variable information.

The embedded information can be part of a printable document by, for example, encoding the information as part of the text of the document. The printable document having the embedded information can be created, modified, or otherwise generated on a computer, such as computer 100 of FIG. 1, or any of the devices illustrated in FIG. 2. The printable document having the embedded information can be printed on a printer or press 222 or can be transmitted or otherwise sent from one device to another device through the network 220. The "printable document" can be any suitable printed matter that can include the embedded information, as described below, and may include text, graphics, or any combination thereof. The printable document may be printed on any suitable medium including, but not limited to, paper, plastic sheets, metal or ceramic or plastic surfaces, or the like.

Most current covert methods for hiding information on packages and labels are relatively costly or time intensive to create, and are therefore not well suited for use where the information to be conveyed varies rapidly. Physically encoded covert items, such as the selection of media or inks, cannot usually be switched within a job or, at best, allow for only a very small number of combinations.

To embed information into printed matter, the methods and systems described herein deliberately distort or alter the rendering of glyphs from a font in such a way that that distortion or alteration can be used to convey information. This may include encoding the information into the text by distorting or altering the glyphs. As an example, consider a piece of text in upper case, printed using a serif font (one with small lines attached to the ends of strokes in at least some letters or symbols). For every vertical stroke that ends at the text baseline this example font has two serifs, one to the left and one to the right. In a particular rendering the serifs may be omitted selectively, enabling two bits of information to be encoded for every such stroke, yielding four different values: 1) both serifs present, 2) right serif omitted, left present, 3) left serif omitted, right present, and 4) both serifs omitted.

Figure 3:
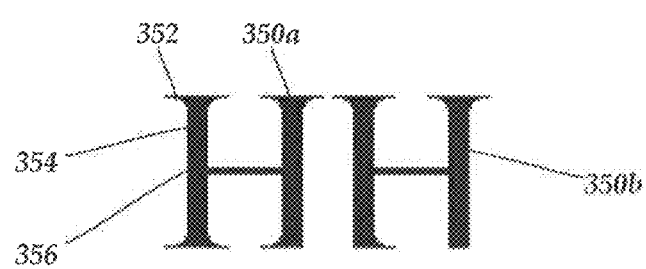
FIG. 3 provides two examples of glyph alterations for encoding information into text, according to the invention.

FIG. 3 illustrates one example with two glyphs 350a, 35b which each represent the text character "H" in a font that includes serifs 352. Each glyph includes strokes 354 (in this case, two longitudinal strokes and one horizontal stroke) and joint 356 where two strokes meet. The left "H" 350a has both serifs present on the first longitudinal stroke and the right bottom serif omitted on the second longitudinal stroke. The right "H" 350b has the left bottom serif omitted on the first longitudinal stroke and both serifs omitted on the second longitudinal stroke. These omissions are quite obvious in the text in FIG. 3, but would be much less so at smaller sizes.

As an example of encoding information in glyphs, simple text in ASCII can be represented with approximately 38 characters (A-Z, 0-9, space, and punctuation). Each character of the encoded information in such a simple representation can be encoded, for example, in 6 bits of information, because 6 bits can carry $2^6$, or 64 distinct values. In this example, six bits can therefore encode for 64 different characters, enough to add lower case letters, accents or specialized glyphs to the most basic representation. Thus, for example, a character of information may be encoded into every three vertical strokes in the visible text, because each vertical stroke can carry two bits of data (the lower left and right serifs). In the case of characters like the "H" in FIG. 3 the top of each vertical stroke can also be used to carry additional data, and those areas of characters that carry only a single serif (such as the lower left and upper left of an upper case 'D') can carry a single bit of data. It will be recognized that other methods of encoding information can include fewer or more bits of information for each character. For example, if the encoded information is solely in numbers 0-9 (with or without a space character), each character of the encoded information can be represented by 4 bits of information because 4 bits can carry $2^4$, or 16 distinct values.

Figure 4:
FIG. 4 is an example of a number of places in a word for encoding information into text, according to the invention.

Thus, in at least one embodiment, utilizing each of the serifs of each letter the word COPYRIGHT, in FIG. 4, can carry 35 bits of data, each bit site being denoted with a dot, very nearly enough to carry 6 characters of hidden data in simple ASCII, when using this very simple example method of encoding data by the presence or omission of serifs.

It will be recognized that other methods of encoding information can include fewer or more bits of information for each character. For example, if the encoded information is solely in numbers 0-9 (with or without a space character), each character of the encoded information can be represented by 4 bits of information because 4 bits can carry $2^4$, or 16 distinct values.

The information can be encoded into any font where a distortion or alteration of one or more glyphs can be printed sufficiently reliably in a way that the reading tool can identify and extract the information. The example of missing serifs above is one method of conveying that information, but others are possible, such as altering the character or stroke width, leaving gaps in strokes or at joints between strokes, rendering strokes slightly shorter or longer than normal (e.g., altering stroke length), adjusting points such as stroke joins up, down or sideways within the glyph representation, adjusting the relative size of features, such as the upper and lower bowls of an upper case 'B', or the like. It will be recognized that, at least in some embodiments, the distortions are not visible to the naked eye. Any measurable feature of the printed representation of a glyph outline could be used to encode or hide information, as long as the deviation from the original glyph outline can be measured reliably.

In at least some embodiments, multiple different types of distortions or alternations can be used in a single printed piece to encode different information or to duplicate the information in support of counterfeit detection or error correction or the like.

To extract the encoded information a reading tool is employed. The reading tool can be on a device, such as, for example, computer 100 of FIG. 1 or any of the devices in FIG. 2. The reading tool takes an image of the printed matter (for example, a photograph, a scan, or the like) and compares the outline of each glyph with pre-defined expected appearances. By matching the imaged glyph against one such pre-defined glyph shape it determines the information encoded within that printed glyph. Alternate methods are also possible, including algorithmically identifying specific features of the glyph, such as the presence or absence of serifs.

Additional encryption (for example, the use of ciphers or the like) can be used to alter the message carried in the embedded information for further security. Also, data compression techniques, such as the use of flate or LZW compression, may be used to pack more information into the visible glyphs shown.

It will be recognized that printing, even printing on a digital press, is a physical process and will therefore introduce some noise. In at least some embodiments, the size of the distortion of the glyphs is selected such that it is likely to be correctly readable from the printed piece without being so large that it is readily observable. In at least some embodiments, embedded information may be repeated or may include elements, such as internal check-sums, for error correction or error identification. When a check-sum is employed, the reading tool uses the body of the data decoded from the printed document to calculate a check-sum or hash using the same algorithm as the writing tool. That check-sum would then be compared with the check-sum read from the encoded data. If the two check-sums match then the reader can be confident that the data has been read correctly. If the check-sums do not match the data can be treated as suspect. In at least some embodiments, the reading tool also applies this error correction to extract the most reliable data from the printed material.

It will also be recognized that scanning or copying the printed document is also a physical process, and may introduce additional changes in the outline of the text. In at least some embodiments, when the scale of the distortion used is selected such that it is just large enough to be identified in the original printed document it might not to be readable from a copy of the original printed document, thus showing that the copy is not an original. Such copying errors may also be useful for detection of copies or forgeries. For example, if a forger copies or otherwise re-creates the original document, the embedded information may be missing or distorted, thereby facilitating detection of the forgery or copy.

In some embodiments, a pre-generated font can include individual glyphs for each of the variations of a particular text character for the different alterations that may be made to the glyph in order to encode information. Alternatively, the information may be imposed on a pre-created font by a renderer or character generator. The renderer or character generator can be part of the computer 100 or any of the devices illustrated in FIG. 2. Alternatively, the renderer or character generator can be part of the printer or press 222.

The distorted or altered rendering of text glyphs can be performed in several different ways. In at least some embodiments, an outline font or collection of fonts is prepared that includes multiple variant glyphs of each text character, each with slightly different outlines. The renderer or character generator selects one from the set. This method can be used with all existing outline font types. The selection of which font/glyph/variant to use could be made in the design tool, in the font itself (e.g. by overloading the encoding selection), or can be performed in the renderer or character generator.

In at least some embodiments, a pre-rendered bitmap font or collection of fonts is prepared that includes multiple variant glyphs of each text character, each with slightly different outlines. The renderer or character generator selects one from the set. This method can be used with all existing bitmap font types. The selection of which font/glyph/variant to use could be made in the design tool, in the font itself (e.g. by overloading the encoding selection), or can be performed in the renderer or character generator.

In at least some embodiments, an outline font is created that calculates the position of outline points or applies hinting differently depending on information that is supplied by the renderer or character generator. The rendered glyphs are not cached for re-use when the same glyph is encountered again or the cache includes knowledge of the supplementary information and retains multiple variants for each glyph in the cache. This method could be used, for example, in a specially created PostScript Type 3 font, or a new form of font could be created in order to apply the information to be hidden within the output.

In those cases where the glyph adjustment or selection of pre-adjusted glyphs is made in the renderer or character generator, the renderer or character generator may make use of a variety of fonts delivered as a part of the job itself, or the renderer or character generator may replace (or substitute) an appropriate font or collection of fonts for a font used within the job, as supplied by the design tool used to create the job in the first place.

The encoding of information into glyphs of a printable document and the decoding (or extracting) of encoded information from a document can be performed using any of the methods and systems described above.

Figure 5:
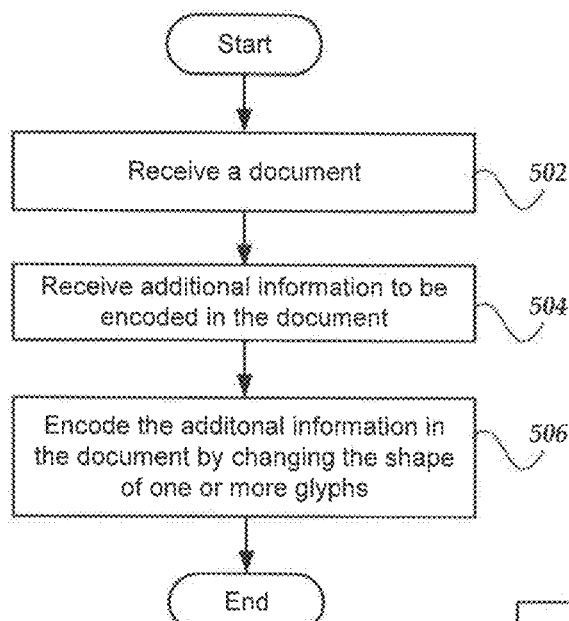
FIG. 5 is a schematic flowchart of one embodiment of a method of encoding information into text of a printable document, according to the invention.

FIG. 5 is a flowchart illustrating one embodiment of a method of encoding information into text of a printable document. In step 502, a document that includes text is received. The text includes glyphs, where each glyph corresponds to a text character. In step 504, additional information to be encoded in the document is received. In step 506, this addition information is encoded into the document by altering one or more of the glyphs to change a shape of the one or more of the glyphs, as described above. Each of the altered glyphs still corresponds to the text character to which the glyph corresponded prior to alteration and the altered glyph further contains a portion of the additional information encoded by the changed shape. For example, the shape of the glyph can be altered by removing one or more serifs, altering a width or length of at least one stroke or the glyph, altering a position of a joint between strokes or adjusting a size of a feature; or placing a gap in a stroke or in a joint between strokes.

Figure 6:
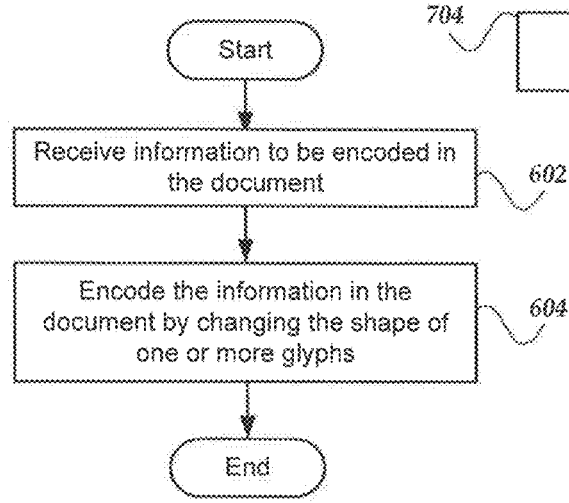
FIG. 6 is a schematic flowchart of another embodiment of a method of encoding information into text of a printable document, according to the invention.

FIG. 6 is a flowchart illustrating one embodiment of a method of encoding information into text of a printable document. In step 602, information to be encoded in a document is received. In step 604, the document is generated and includes glyphs, where each glyph represents a text character and one or more of the glyphs have a shape that encodes a portion of the information in the shape of the glyph while still representing the text character. The document can be generated from existing data or an existing data file or may be generated by a user or by a computer or other device. The information is encoded by selecting a shape of the glyph that is different from a shape of the glyph that does not encode the data. Such differences in shape are described above.

Figure 7:
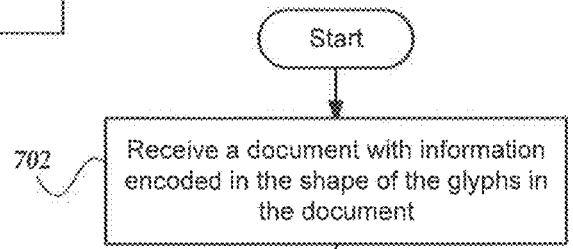
FIG. 7 is a schematic flowchart of one embodiment of a method of extracting encoded information from text of a printable document, according to the invention.

FIG. 7 is a flowchart illustrating one embodiment of a method of extracting encoded information from text of a printable document. In steps 702, a document is received. The document includes glyphs, where each glyph represents a text character. One or more of the glyphs have a shape that encodes a portion of the encoded information in the shape of the glyph while still representing the text character. In step 704, the encoded information is extracted from the document by investigating each of the glyphs and retrieving the encoded information by observation of the shapes of the glyphs. The document can be an original document or may be a copy of a document. In some embodiments, these methods of encoding and extracting can be used to authenticate or verify documents. Such documents can include, but are not limited to, legal or financial documents, banknotes, labels, printing on manufactured articles, and the like.

In some embodiments, the encoding of information alters the document file and may include altering the character encoding information or character codes or font information. In some embodiments, the encoding of information alters the printed document during the printing process (e.g., the alteration occurs during the printing of the document and may be performed by a renderer or character generator) with or without altering the document file. In some of these embodiments, the printed characters are altered, as described above, without altering the character encoding information or character codes in the document file. Steps 506 and 604, described above, can include either altering the document file or altering document as it is printed or any combination thereof. Thus, in some embodiments, the encoded information is incorporated only in the printed document and not in the document file because the printed document is altered, as described above, but the document file is not altered. In other embodiments, the encoded information is incorporated in the document file and in any document printed from the document file.

The methods and systems described herein may be embodied in many different forms and should not be construed as limited to the embodiments set forth herein. Accordingly, the methods and systems described herein may take the form of an entirely hardware embodiment, an entirely software embodiment or an embodiment combining software and hardware aspects. Systems referenced herein typically include memory and typically include methods for communication with other devices including mobile devices. Methods of communication can include both wired and wireless (e.g., RF, optical, or infrared) communications methods and such methods provide another type of computer readable media; namely communication media. Wired communication can include communication over a twisted pair, coaxial cable, fiber optics, wave guides, or the like, or any combination thereof. Wireless communication can include RF, infrared, acoustic, near field communication, Bluetooth™, or the like, or any combination thereof.

It will be understood that each block of the flowchart illustrations, and combinations of blocks in the flowchart illustrations and methods disclosed herein, can be implemented by computer program instructions. These program instructions may be provided to a processor to produce a machine, such that the instructions, which execute on the processor, create means for implementing the actions specified in the flowchart block or blocks disclosed herein. The computer program instructions may be executed by a processor to cause a series of operational steps to be performed by the processor to produce a computer implemented process. The computer program instructions may also cause at least some of the operational steps to be performed in parallel. Moreover, some of the steps may also be performed across more than one processor, such as might arise in a multi-processor computer system. In addition, one or more processes may also be performed concurrently with other processes, or even in a different sequence than illustrated without departing from the scope or spirit of the invention.

The computer program instructions can be stored on any suitable computer-readable medium including, but not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by a computer.

The above specification provides a description of the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. A method of encoding information into text of a printable document, the method comprising:
   providing a pre-generated font comprising a plurality of standard glyphs and a plurality of variant glyphs, wherein each of the variant glyphs comprises an alteration of one of the standard glyphs, wherein the alteration is selected from a) removing at least one serif from the standard glyph; b) leaving a visible gap in a stroke or a joint between strokes of the standard glyph; c) altering a width or length of at least one stroke of the standard glyph; d) altering a position of the joint between strokes of the standard glyph; e) adjusting a size of a feature of the standard glyph; or f) any combination thereof;
   receiving a document comprising text, wherein the text comprises a plurality of text characters, wherein each of the text characters can be represented by one of the standard glyphs of the font;
   receiving additional information to be encoded in the document;
   encoding the additional information into the document by selecting, for each of a plurality of the text characters of the document, one of the variant glyphs that is an alteration of the standard glyph that can represent the text character, wherein the variant glyph still corresponds to the text character and further represents a portion of the additional information encoded by the alteration of the variant glyph relative to the standard glyph; and rendering the document using the font.

2. The method of claim 1, wherein at least one of the variant glyphs corresponds to one of the standard glyphs altered by removing at least one serif from each of the one or more standard glyphs.

3. The method of claim 1, wherein at least one of the variant glyphs corresponds to one of the standard glyphs altered by altering a width or length of at least one stroke of each of the one or more standard glyphs.

4. The method of claim 1, wherein at least one of the variant glyphs corresponds to one of the standard glyphs altered by altering a position of the joint between strokes or adjusting a size of a feature of each of the one or more standard glyphs.

5. The method of claim 1, wherein at least one of the variant glyphs corresponds to one of the standard glyphs altered by placing the visible gap in the stroke or in the joint between strokes of each of the one or more standard glyphs.

6. A system for processing a document for printing, the system comprising:
　at least one processor configured and arranged to perform the method of claim 1.

7. A non-transitory computer-readable medium having processor-executable instructions for processing documents, the processor-executable instructions when installed onto a device enable the device to perform the method of claim 1.

8. A method of encoding information into text of a printable document, the method comprising:
　providing a pre-generated font comprising a plurality of standard glyphs and a plurality of variant glyphs, wherein each of the variant glyphs comprises an alteration of one of the standard glyphs, wherein the alteration is selected from a) removing at least one serif from the standard glyph; b) leaving a visible gap in a stroke or a joint between strokes of the standard glyph; c) altering a width or length of at least one stroke of the standard glyph; d) altering a position of the joint between strokes of the standard glyph; e) adjusting a size of a feature of the standard glyph; or f) any combination thereof;
　receiving information to be encoded in a document; and
　rendering the document using the font and incorporating the information to be encoded, wherein the document comprises a plurality of text characters that are represented by the standard glyphs of the font, wherein the information is encoded into the rendered document by selecting, for each of a plurality of the text characters of the document, one of the variant glyphs that is an alteration of the standard glyph that represents the text character, wherein the alteration of the variant glyph encodes a portion of the information in the shape of the variant glyph while still representing the text character.

9. The method of claim 8, wherein at least one of the variant glyphs has at least one serif removed relative to one of the standard glyphs.

10. The method of claim 8, wherein at least one of the variant glyphs has at least one stroke with a different width or length as compared to a one of the standard glyphs.

11. The method of claim 8, wherein at least one of the variant glyphs has a position of the joint between strokes or a feature that is different than a one of the standard glyphs.

12. The method of claim 8, wherein at least one of the variant glyphs has the visible gap in the stroke or in the joint between strokes.

13. A system for processing a document for printing, the system comprising:
　at least one processor configured and arranged to perform the method of claim 8.

14. A non-transitory computer-readable medium having processor-executable instructions for processing documents, the processor-executable instructions when installed onto a device enable the device to perform the method of claim 8.

15. A method of extracting encoded information from text of a printable document, the method comprising:
　providing, a pre-generated font comprising a plurality of standard glyphs and a plurality of variant glyphs, wherein each of the variant glyphs comprises an alteration of one of the standard glyphs, wherein the alteration is selected from a) removing at least one serif from the standard glyph; b) leaving a visible gap in a stroke or a joint between strokes of the standard glyph; c) altering a width or length of at least one stroke of the standard glyph; d) altering a position of the joint between strokes of the standard glyph; e) adjusting a size of a feature of the standard glyph; or f) any combination thereof;
　receiving a document, wherein the document comprises a plurality of text characters that are represented by the standard glyphs and variant glyphs of the font; and
　extracting the encoded information from the document from the variant glyphs in the document and retrieving the encoded information by observation of the alterations of the variant glyphs in the document.

16. The method of claim 15, wherein at least one of the variant glyphs has at least one serif removed as compared to a one of the standard glyphs.

17. The method of claim 15, wherein at least owe of the variant glyphs has at least one stroke with a different width or length as compared to a one of the standard glyphs.

18. The method of claim 15, wherein at least one of the variant glyphs has a position of the joint between strokes or a feature or the visible gap in the stroke or the joint between strokes that is different than a one of the standard glyphs.

19. A system for processing a document for printing, the system comprising:
　at least one processor configured and arranged to perform the method of claim 15.

20. A non-transitory computer-readable medium having processor-executable instructions for processing documents, the processor-executable instructions when installed onto a device enable the device to perform the method of claim 15.

* * * * *